(12) United States Patent  
Cho

(10) Patent No.: US 8,477,947 B2
(45) Date of Patent: Jul. 2, 2013

(54) OPTICAL PHASE MODULATION METHOD AND APPARATUS FOR QUANTUM KEY DISTRIBUTION

(75) Inventor: Jeong-sik Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 12/899,128

(22) Filed: Oct. 6, 2010

(65) Prior Publication Data
US 2011/0150226 A1 Jun. 23, 2011

(30) Foreign Application Priority Data

Dec. 21, 2009 (KR) .................. 10-2009-0128456

(51) Int. Cl.
*H04L 29/06* (2006.01)
(52) U.S. Cl.
USPC .......... 380/278; 380/277; 380/263; 380/255; 380/256; 713/161; 398/140
(58) Field of Classification Search
USPC ................................. 380/263, 278
See application file for complete search history.

(56) References Cited

U.S. PATENT DOCUMENTS

| 7,113,598 | B2* | 9/2006 | Flusberg et al. | 380/256 |
| 7,310,729 | B2* | 12/2007 | Gordon et al. | 713/161 |
| 2007/0248362 | A1 | 10/2007 | Tanaka et al. | |
| 2009/0046857 | A1* | 2/2009 | Nambu et al. | 380/255 |

FOREIGN PATENT DOCUMENTS

KR 10-0890389 3/2009

OTHER PUBLICATIONS

A. Tajima et al. "Recent Progress in Quantum Key Distribution Network Technologies." European Conference on Optical Communications, 2006. ECOC 2006 (978-2-912328-39-7): p. 1-3.*

* cited by examiner

*Primary Examiner* — Taghi Arani
*Assistant Examiner* — Narciso Victoria
(74) *Attorney, Agent, or Firm* — Nelson Mullins Riley & Scarborough LLP; EuiHoon Lee, Esq.

(57) ABSTRACT

Provided is an optical phase modulating method and apparatus for a quantum key distribution. When an optical phase modulator is arranged outside an optical interferometer, a configuration of the optical interferometer may be simplified, and an extension of an optical path caused by the optical phase modulator, instability and an insertion loss increased in the optical interferometer, and the like, may be overcome. An output feature may be improved by adjusting an applied voltage of the optical phase modulator arranged outside the optical interferometer.

18 Claims, 10 Drawing Sheets

FIG. 3
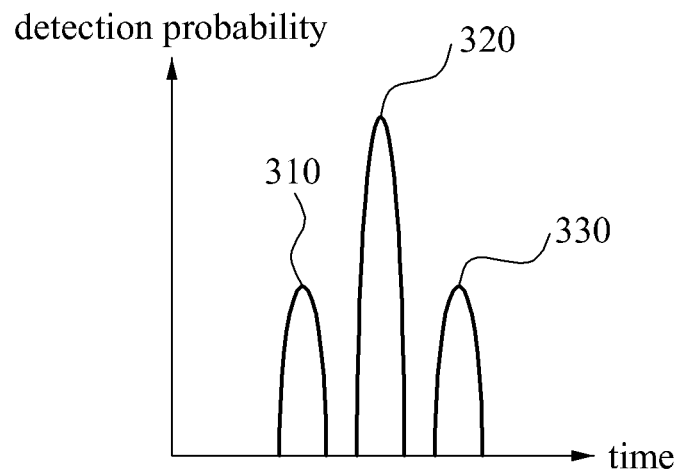
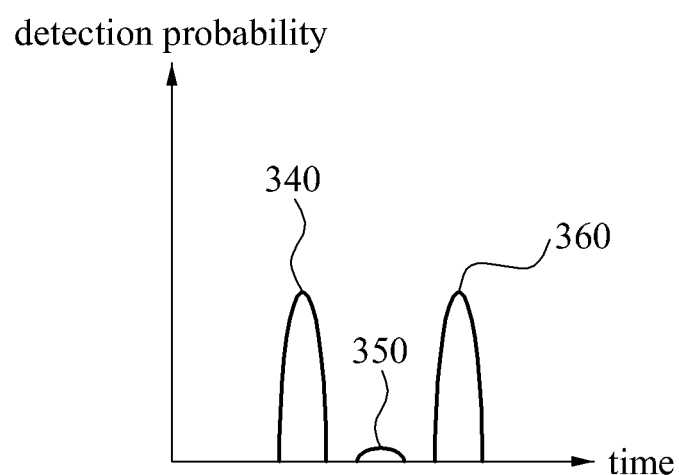

OPTICAL PHASE MODULATION METHOD AND APPARATUS FOR QUANTUM KEY DISTRIBUTION

CROSS-REFERENCE TO RELATED APPLICATION

This application claims the benefit of Korean Patent Application No. 10-2009-0128456, filed on Dec. 21, 2009, in the Korean Intellectual Property Office, the disclosure of which is incorporated herein by reference.

BACKGROUND

1. Field of the Invention

The present invention relates to a method that may arrange an optical phase modulator outside an interferometer and may modulate an optical phase in a phase modulation based quantum key distribution system.

2. Description of the Related Art

A quantum key distribution system may load key information on a single photon and may transmit the single photon to a receiver by adjusting a polarization or a phase of the single photon. A receiver may extract the key information using a polarization receiver, an optical phase modulator, and the like. The single photon transmission may be embodied based on optical communication technologies, and the quantum key distribution system intending to perform long-distance transmission may use a single mode optical fiber as a quantum channel. When a polarization-modulated single photon is transmitted through the single mode optical fiber, a polarization feature becomes unstable and thus, a phase modulation scheme is preferred for the key distribution than the polarization modulation scheme.

The phase modulation-based quantum key distribution system may mainly use a time-division optical interference scheme. An asymmetric optical interferometer and an optical phase modulator, and the like may be used to perform the time-division optical interference. The asymmetric optical interferometer may have two paths having different lengths, and the two paths may be used for an optical interference. A probability of existence of a single photon inputted to the asymmetric optical interferometer may be divided into two distributions of which probabilities of existence of the single photon have different coordinates in a time domain. The optical phase modulator modulates a phase of a single photon passing through one of the two paths. An asymmetric optical interferometer of the receiver may divide a probability of existence into four coordinates in the time domain. When a path difference of an asymmetric optical interferometer of a transmitter and a path difference of the asymmetric optical interferometer of the receiver are the same, adjacent two probabilities among the four probabilities of existence of the single photon may overlap with each other and may cause interference. The receiver may include an optical phase modulator, and the optical phase modulator may modulate a phase of the single photon. When a sum of phases modulated by the transmitter and the receiver is $2n\pi$, n being a natural number, the overlapped two probabilities of existence of the single photon may show a maximal detection probability by constructive interference, and when a sum of a sum of phases modulated by the transmitter and the receiver is $(2n+1)\pi$, the overlapped two probabilities of existence of single photon may shows a minimal detection probability by destructive interference.

A stability with respect to a polarization and a phase feature of the optical interferometer may be secured to obtain an excellent optical interfering performance. Two single photons interfering with each other may have the same polarization, and a phase with respect to an entire optical path, excluding a phase modulation value additionally provided by the optical phase modulator, may be maintained.

An optical interferometer for a conventional phase modulation based-quantum key distribution system may arrange the optical phase modulator inside an interferometer path.

FIG. 1 illustrates an example of a configuration of a conventional optical interferometer. A quantum key distribution system may include a transmitting-end 110, a channel 120, and a receiving-end 130. The transmitting-end 110, the channel 120, and the receiving-end 130 may be connected with each other. The optical interferometer may be a Mach-Zehnder type interferometer. The optical interferometer may receive a photon from a light source 101, and a delay line 103 and an optical phase modulator 104 used for constituting an asymmetric optical interferometer may be arranged between a beam splitter 102 and a beam splitter 105. In the receiving-end 103, a delay line 133 and an optical phase modulator 134 used for constituting the asymmetric optical interferometer may be arranged between a beam splitter 132 and a beam splitter 135. Photon detection may be performed by two single photon detectors 138 and 139. A high-speed optical phase modulator may be used for high-speed transmission of a quantum key. The high-speed optical phase modulator may be manufactured based on a $LiNbO_3$-based planar lightwave circuit scheme. Both ends of a $LiNbO_3$-based optical phase modulator may be pigtailed with optical fibers. When an optical modulator to which a pigtailed optical fiber is attached is inserted to the optical interferometer, a length of an optical path is extended and thus, instability of the optical interferometer may increase, and a configuration may become complex. The optical interferometer may be configured based on a polarization-dependent feature of the planar lightwave circuit and thus, difficulty in configuring the optical interferometer may increase.

The instability of the asymmetric optical interferometer due to the extended optical path may be caused by the following:

An optical fiber-based optical interferometer may be sensitive to a change in vibration and temperature. Specifically, an optical fiber may have a change in an effective length, as shown in Equation 1, due to a thermo-optic coefficient and a thermal expansion coefficient. As a length is extended and becomes longer, the change in the effective length may be higher.

$$\frac{d(nl)}{dT} = l\frac{dn}{dT} + n\frac{dl}{dT} = nl\left(\frac{1}{n}\frac{dn}{dT} + \frac{1}{l}\frac{dl}{dT}\right) \quad \text{[Equation 1]}$$

In Equation 1, n may denote an effective refractive index, l may denote a length of the optical path, and T may denote a temperature. dn/dT may denote a thermo-optic coefficient and 1/l*dl/dT may denote a thermal expansion coefficient. An amount of change in an effective length of an optical path with respect to an asymmetric optical interferometer of transmitter and an amount of change in an effective length of an optical path with respect to an asymmetric optical interferometer of the receiver may be different, the transmitter and the receiver being in different environments. Therefore, relative phases of two single photons may not be maintained to be a predetermined value.

Unlike the example of FIG. 1, when a Michelson interferometer is used, the length of the optical path may be extended and become longer and thus, the instability may be higher. The optical phase modulator may basically include an insertion loss of several dBs and thus, a loss difference between two asymmetric paths may be relatively higher when the Michelson interferometer is applied.

Various schemes may be attempted to overcome difficulties of a conventional scheme. One attempt is decreasing of a length of a pigtailed optical fiber. However, there is limit to the decreasing of the length, since a predetermined length may need to be secured when an optical path may be constructed using an optical connector and an optical fiber fused connection, and the like. Another attempt is to not perform of pigtailing to the optical phase modulator. However, when the optical phase modulator to which the pigtail is not performed is applied to the optical fiber-based interferometer, a complex optical alignment problem may be incurred.

SUMMARY

An aspect of the present invention provides an apparatus and method of arranging an optical phase modulator and a phase modulation method thereof.

According to an aspect of the present invention, there is provided a transmitting apparatus of a quantum key distribution system, the transmitting apparatus including an optical interferometer to receive a single photon inputted from a light source, and to divide a path into a plurality of paths to enable a probability of existence of the inputted single photon to be distributed in a plurality of coordinates in a time domain, and an optical phase modulator being connected to an outside of the optical interferometer, and modulating a phase of a single photon corresponding to at least one path from among the plurality of paths.

The optical interferometer may include one of an optical fiber-based Mach-Zehnder interferometer and an optical fiber-based Michelson interferometer, and the optical interferometer may include one of an optical system-based Mach-Zehnder interferometer and an optical system-based Michelson interferometer.

According to an aspect of the present invention, there is provided a receiving apparatus of a quantum key distribution system, the receiving apparatus including an optical phase modulator to receive a single photon from a transmitting apparatus of a quantum key distribution system, and to modulate a phase of a single photon that is not modulated from the received single photon, and an optical interferometer to divide a path of the single photon received from the optical phase modulator to enable a probability of existence of the single photon received from the optical phase modulator to be distributed in a plurality of coordinates in a time domain, and the optical phase modulator is connected to an outside of the optical interferometer.

The optical interferometer may include one of an optical fiber-based Mach-Zehnder interferometer and an optical fiber-based Michelson interferometer, and the optical interferometer may include one of an optical system-based Mach-Zehnder interferometer and an optical system-based Michelson interferometer.

According to an aspect of the present invention, there is provided a quantum key distribution system, the system including a transmitting-end optical phase modulating unit including an optical phase modulator to input, with respect to a single photon, a modulation signal of which a time and a width is adjusted, a path of the single photon being divided into a plurality of paths to enable a probability of existence of the single photon to be distributed in a plurality of different coordinates, and to selectively modulate a phase of a single photon corresponding to at least one path from among the plurality of paths, and a receiving-end optical phase modulating unit to selectively modulate a phase of a single photon that is not modulated by the transmitting-end optical phase modulating unit from the single photon received via the transmitting-end optical phase modulating unit.

An applied voltage of the receiving-end optical phase modulating unit may be determined based on a phase difference between two optical interferometers respectively established in a transmitting-end and a receiving-end. In this case, the phase difference may be calculated based on a number of single photons detected with a maximal probability and a number of single photons detected with a minimal probability.

According to an aspect of the present invention, there is provided a transmitting method of a quantum key distribution system, the method including receiving a single photon inputted from a light source, performing an optical interfering process that divides a path of the single photon into a plurality of paths to enable a probability of an existence of the single photon to be distributed in a plurality of coordinates in a time domain, and performing an optical modulating process that modulates a phase of a single photon corresponding to at least one path from among the plurality of paths, outside an apparatus where the optical interfering process is performed.

According to an aspect of the present invention, there is provided a receiving method of a quantum key distribution system, the receiving method including performing an optical phase modulating process that receives a single photon transmitted via a transmitting-end, and modulates a phase of a single photon that is not modulated from the received single photon, and performing an optical interfering process that divides a probability of existence of the optical phase modulated-single photon to be distributed, with a plurality of different probabilities, in a time domain, and optical modulating process is performed separately from the optical interfering process.

According to an aspect of the present invention, there is provided an optical phase modulating method of a quantum key distribution system, the method including a transmitting-end optical phase modulating process of inputting, with respect to a single photon, a modulation signal of which a time and a width is adjusted, a path of the single photon being divided into a plurality of paths to enable a probability of existence of the single photon to be distributed in a plurality of different coordinates, and of selectively modulating a phase of a single photon corresponding to at least one path from among the plurality of paths, and a receiving-end optical phase modulating process of selectively modulating a phase of a single photon that is not modulated by the transmitting-end optical phase modulating process from the single photon received via the transmitting-end optical phase modulating process.

According to embodiments, when an optical phase modulator is arranged outside an optical interferometer, a configuration of an interferometer may be simplified, and it is easy to replace the optical interferometer with another interferometer having difference configuration. A path difference between two paths of an asymmetric optical interferometer may be easily set. Also, difficulties, such as extension of an optical path caused by the optical phase modulator, instability and an insertion loss increased in the optical interferometer, and the like, may be overcome.

According to embodiments, an output feature of an interferometer may be improved, for example, correction of a phase difference between an optical interferometer of a transmitter and an optical interferometer of a receiver may be accomplished by adjusting an applied voltage of the optical phase modulator arranged outside the optical interferometer.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 3 illustrates detection probability distributions of a single photon when a time-division optical interference, namely, a constructive interference or a destructive interference, is performed according to an embodiment of the present invention;

DETAILED DESCRIPTION

Figure 1:
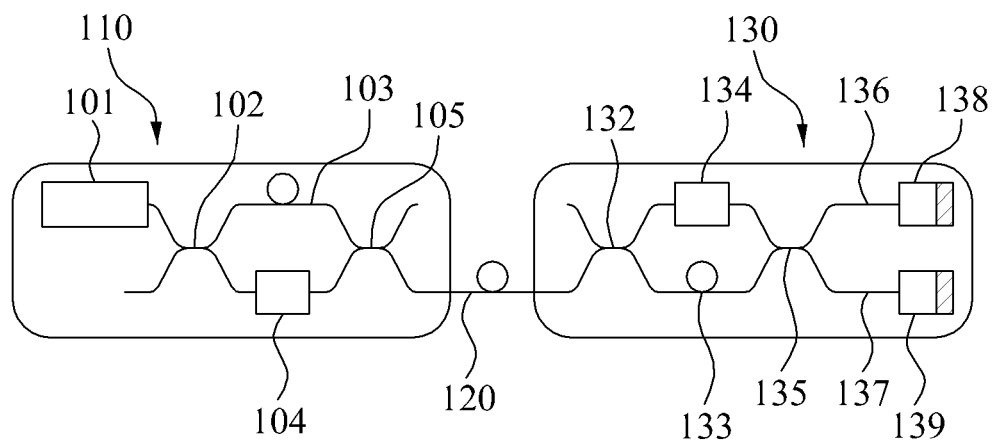
FIG. 1 is a diagram illustrating an example of a conventional optical interferometer.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
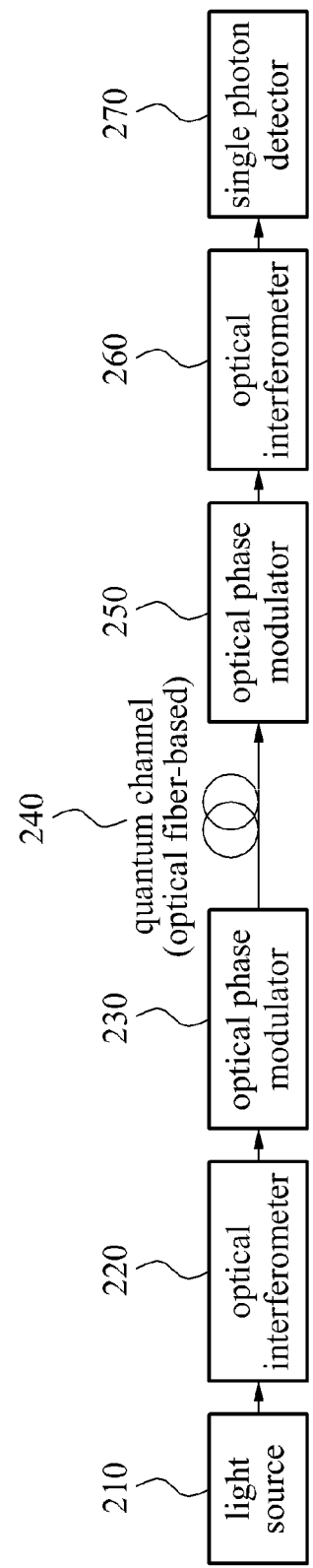
FIG. 2 is a diagram illustrating a quantum key distribution system where an optical phase modulator is connected to an outside of an optical interferometer according to an embodiment of the present invention.

FIG. 2 illustrates a quantum key distribution system where an optical phase modulator is connected to an outside of an optical interferometer according to an embodiment of the present invention.

Referring to FIG. 2, a single photon from a light source 210 may be inputted to an optical interferometer 220, and a path may be divided to enable a probability of existence to be distributed in two different coordinates in a time domain. An optical phase modulator 230 being connected to an outside of the optical interferometer 220 may phase-modulate a single photon corresponding to one of the two coordinates. After the single photon is transmitted via an optical fiber-based photon channel 240, a single photon that is not phase-modulated may be phase-modulated in the optical phase modulator 250. Two single photons may be divided and overlapped in an optical interferometer 260 and may be detected by a single photon detector 270.

FIG. 3 illustrates detection probability distributions of a single photon when a time-division optical interference, namely, a constructive interference or a destructive interference, is performed according to an embodiment of the present invention.

Referring to FIGS. 2 and 3, the two single photons may be divided and overlapped in the optical interferometer 260 and may be detected by the single photon detector 270 with a single photon detection probability based on an optical interference, such as distributions of FIG. 3. Among four single photon distributions generated by two asymmetric optical interferometers, adjacent two single photon distributions may interfere with each other and the remaining two single photon distributions may not be interfered with. Single photons of probability distributions indicating probabilities that the single photon distributions are not interfered with, such as probability distributions 310, 330, 340 and 360, may have predetermined detection value and thus, may not transmit any key. Adjacent two single photons may have a maximal detection probability 320 by constructive interference or may have a minimal detection probability 350 by destructive interference.

According to an embodiment of the present invention, the optical phase modulators 230 and 250 may be arranged outside the optical interferometers 220 and 260 and thus, the optical phase modulators 230 and 250 may be configured regardless of a type of optical interferometer.

Figure 4:
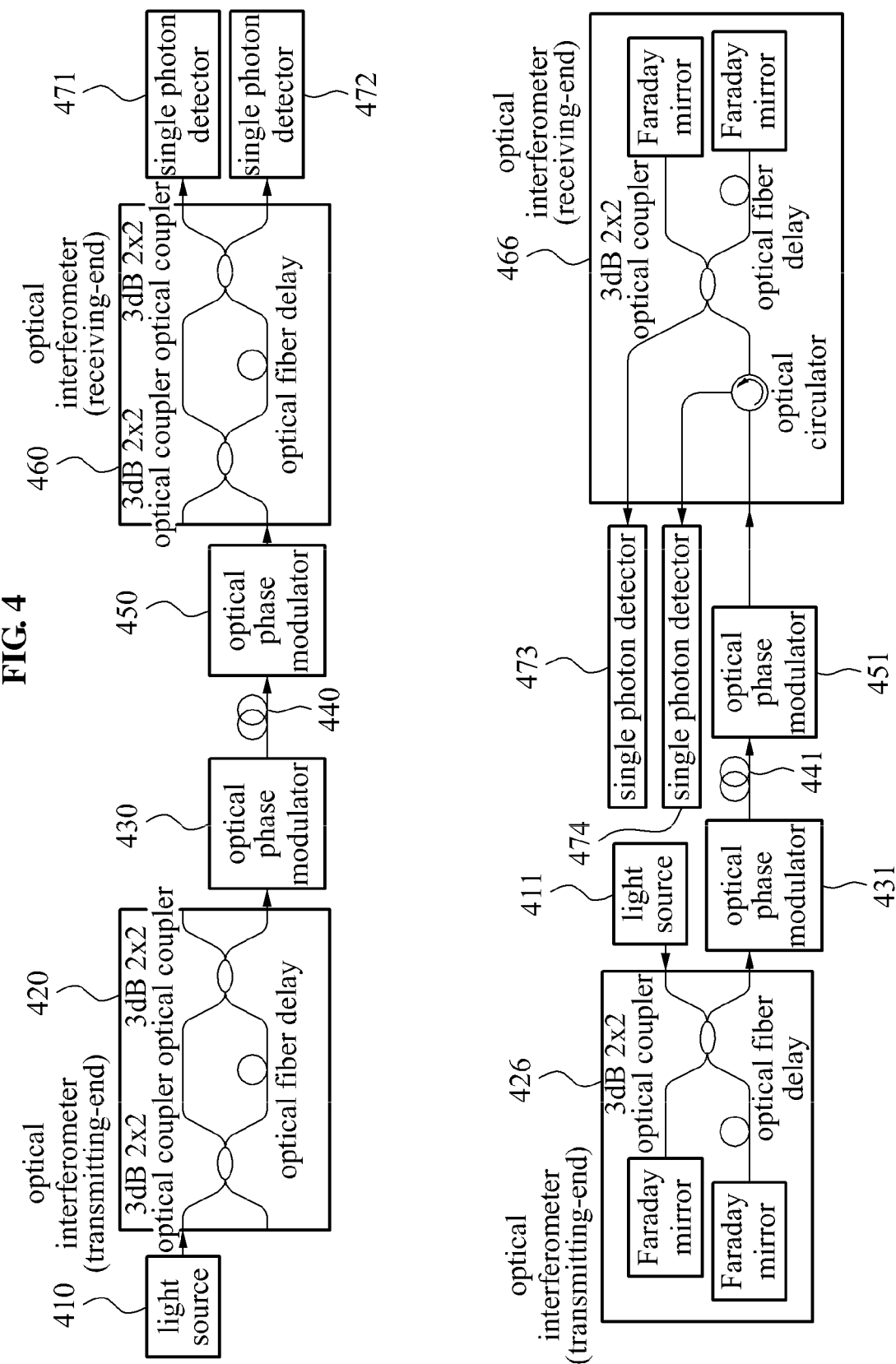
FIG. 4 is a diagram illustrating examples where an optical phase modulator is arranged outside an optical fiber-based Mach-Zehnder interferometer and where an optical phase modulator is arranged outside an optical fiber-based Michelson interferometer, according to an embodiment of the present invention.

FIG. 4 illustrates examples where an optical phase modulator is arranged outside an optical fiber-based Mach-Zehnder interferometer, and where an optical phase modulator is arranged outside an optical fiber-based Michelson interferometer, according to an embodiment of the present invention.

Referring to FIG. 4, in the example using the optical fiber-based Mach-Zehnder interferometer, a single photon inputted from a light source 410 may pass through a Mach-Zehnder interferometer 420 and may be phase-modulated by an optical phase modulator 430 being outside the optical fiber-based Mach-Zehnder interferometer 420. Subsequently, the single photon may pass through a receiving-end optical phase modulator 450 via the quantum channel 440, may pass through a Mach-Zehnder interferometer 460, and may be detected by single photon detectors 471 and 472.

Referring to FIG. 4, in the example using the Michelson interferometer, a single photon inputted from a light source 411 may pass through a Michelson interferometer 426 and may be phase-modulated by an optical modulator 431 being outside the Michelson interferometer 426. Subsequently, the single photon may pass through a receiving-end optical phase modulator 451 via a quantum channel 441, may pass through a Michelson interferometer 466, and may be detected by single photon detectors 473 and 474.

For example, although not illustrated, in the optical fiber-based Mach-Zehnder optical interferometers 420 and 460, a polarization controller may be inserted into an optical path to enable polarizations of two output single photons of optical interferometer to be the same, or a polarization maintaining fiber may be used. The Michelson interferometers 426 and 466 may use a Faraday mirror to offset a change in a polarization on a path and thus, the polarizations of the two output single photons of the optical interferometer may be the same.

Figure 5:
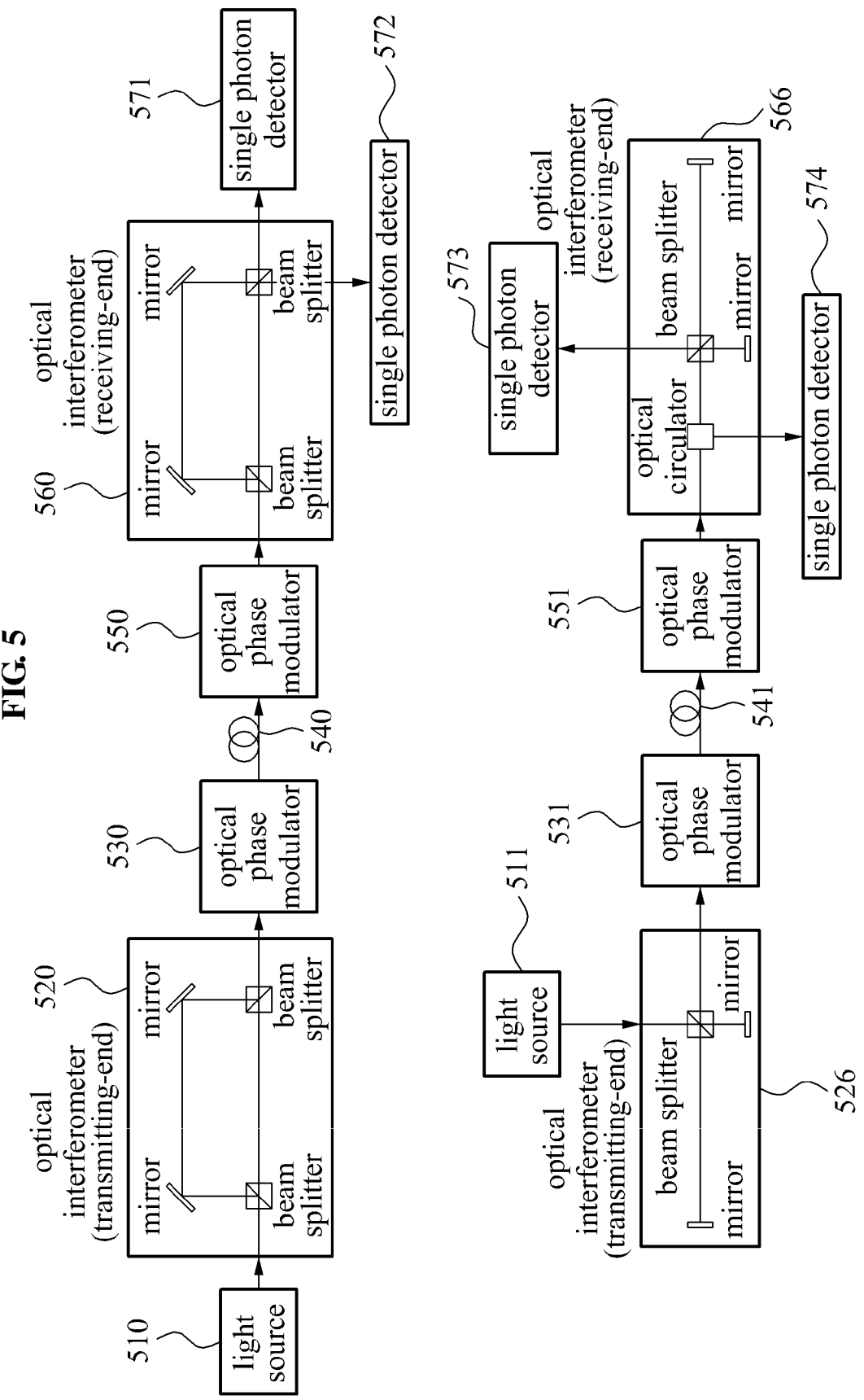
FIG. 5 is a diagram illustrating examples where an optical phase modulator is arranged outside an optical system-based Mach-Zehnder interferometer and where an optical phase modulator is arranged outside an optical system-based Michelson interferometer, according to an embodiment of the present invention.

FIG. 5 illustrates examples where an optical phase modulator is arranged outside an optical system-based Mach-Zehnder interferometer, and where an optical phase modulator is arranged outside an optical system-based Michelson interferometer, according to an embodiment of the present invention.

Referring to FIG. 5, in the example using the optical system-based Mach-Zehnder optical interferometer, a single photon inputted from a light source 510 may pass through an optical system-based Mach-Zehnder optical interferometer 520 and may be phase-modulated by an optical phase modulator 530 being outside the Mach-Zehnder optical interferometer 520. Subsequently, the single photon may pass through a receiving-end optical phase modulator 550 via a quantum channel 540, may pass through an optical system-based Mach-Zehnder optical interferometer 560, and may be detected by single photon detectors 571 and 572.

Referring to FIG. 5, in the example using the optical system-based Michelson interferometer, a single photon inputted from a light source 511 may pass through an optical system-based Michelson optical interferometer 526 and may be phase-modulated by an optical phase modulator 531 being outside the Michelson optical interferometer 526. Subsequently, the single photon may pass through a receiving-end optical phase modulator 551 via a quantum channel 541, may pass through an optical system-based Michelson optical interferometer 566, and may be detected by single photon detectors 573 and 574.

When an optical phase modulator is arranged outside an optical interferometer, various advantages may be provided in addition to an example where a pigtailed $LiNbO_3$-based optical phase modulator is applied. First, a configuration of an interferometer may be simplified, and it is easy to replace the optical interferometer with another interferometer having difference configuration. A path difference between two paths of an asymmetric optical interferometer may be easily set. Generally, a refractive index of the optical phase modulator is different from a refractive index of a Silica optical fiber constituting an optical path in the optical fiber-based optical interferometer, and is also different from a refractive index of air constituting an optical path in an optical system-based optical interference. The optical phase modulator may have an optical path based on a thickness or a length of the optical phase modulator. Therefore, when the optical phase modulator is eliminated from the optical path, the length of the optical path of an interferometer may be simply calculated.

According to an embodiment, when the optical phase modulator is arranged outside the optical interferometer, a transmitting-end optical phase modulator and a receiving-end optical phase modulator may perform a phase modulating process based on a method different from a conventional method. The conventional method may arrange the optical phase modulator in one side of the asymmetric optical interferometer and thus, a single photon of which a path is divided into two paths may be modulated regardless of the single photon's relative location. However, according to an embodiment, two adjacent single photons may be phase-modulated while being transmitted and thus, the phase-modulation may be selectively performed and the phase-modulation may be performed based on interference incurred after the two single photons pass through the receiving optical interferometer.

Figure 6:
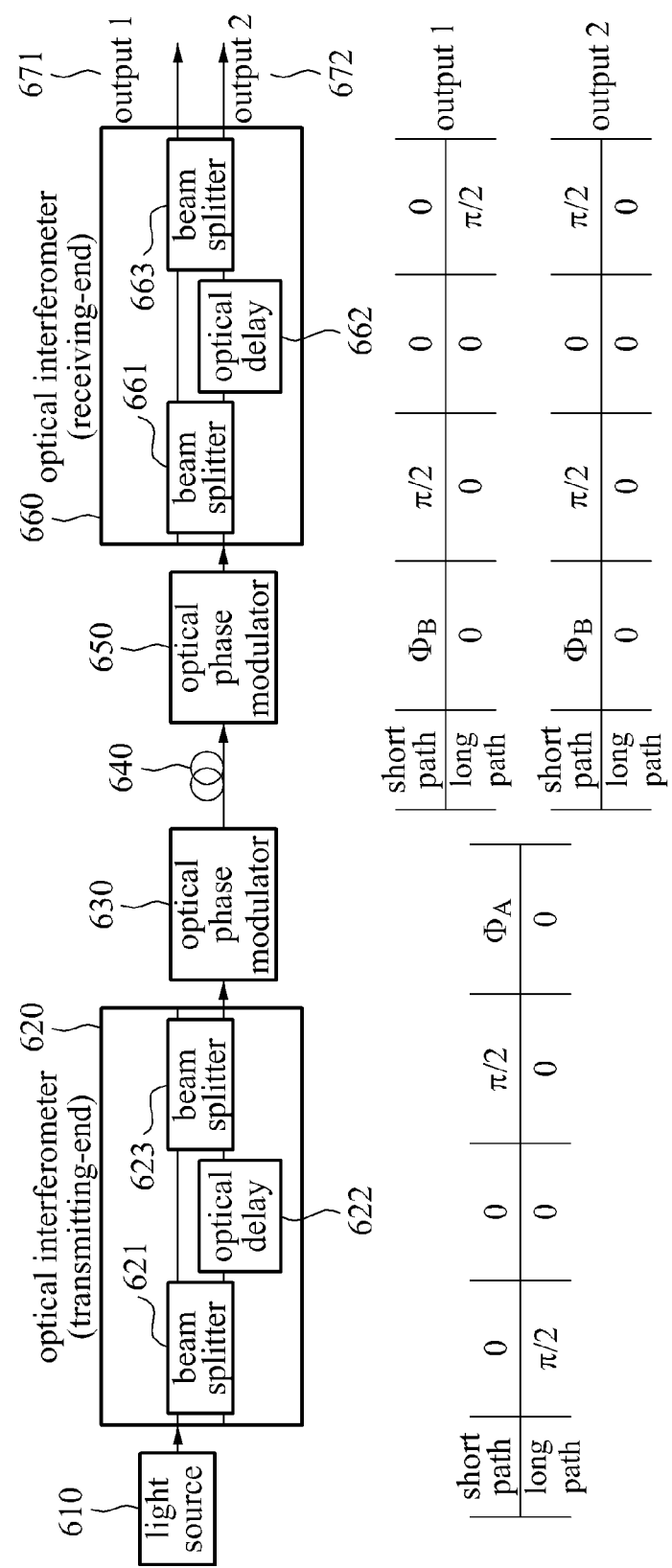
FIG. 6 is a diagram illustrating a number of cases of a phase change based on a phase change incurred in each element unit of a quantum key distribution system and based on two outputs of an optical interferometer of a receiver according to an embodiment of the present invention.

FIG. 6 illustrates a number of cases of a phase change based on a phase change incurred in each element unit of a quantum key distribution system and based on two outputs of an optical interferometer of a receiver according to an embodiment of the present invention.

Referring to FIG. 6, a single photon inputted from a light source 610 may pass through an optical interferometer 620 of transmitting-end and may sequentially pass through a transmitting-end optical phase modulator 630, a quantum channel 640, a receiving-end optical phase modulator 650, and an optical interferometer 660 of a receiving-end.

Referring to FIG. 6, the single photon passing through two asymmetric optical interferometers may show three single photon detection distributions. In this case, two fixed detection distributions that may not contribute interference may be generated when the single photon passes through a shot path, namely, a path excluding an optical delay 622 and an optical delay 662, or when the single photon passes through a long path, namely, a path including the optical delay 622 and the optical delay 662. When a single photo passing through the short path in a first optical interferometer 620 among two asymmetric optical interferometers and passing through the long path in a second optical interferometer 660 meets a single photon passing through in the opposite way, interference may be incurred. Unlike an optical interferometer 620 of a transmitter, the optical interferometer 660 of the receiver may use two outputs of a beam splitter 663, namely, output 1 and output 2. In this case, two outputs have a phase difference of $\pi$. When one side shows a constructive interference output, the other side shows a destructive interference output. A contrast between two outputs may clarify a detection result. Referring to FIG. 6, beam splitters 621, 623, 661, and 663 may generally be embodied based on a 2×2 optical coupler. In the 2×2 optical coupler, a phase change may not be incurred for a parallel input and output, whereas a phase change of $\pi/2$ may be incurred for an output crossing over an input. In a beam splitter used for an optical system-based optical interferometer, when an input is projected from a side of air to a boundary surface between the air and the medium, a phase change of $\pi$ may be accompanied by only a reflection of a transverse magnetic mode wave, and a phase change may not be incurred by remaining cases. Conversely, when the input is projected from a side of the medium, a phase change of $\pi$ may be accompanied by only a reflection of a transverse electric mode wave, and a phase change may not be incurred by remaining cases. With respect to a case where the optical phase modulator is arranged outside the optical system-based optical interferometer, a phase change of each element unit, such as beam splitters and optical delays 622 and 662 in the optical interferometer, and optical phase modulators 630 and 650, may be organized for each type of path, namely, a short path and a long path, and may be illustrated beneath a corresponding element unit. Although the optical system-based optical interference interferometer is used, an operation principle may be the same.

Table 1 may organize a phase of a final interference light that may be generated by a combination of paths of the two asymmetric optical interferometer of FIG. 6 according to an embodiment of the present invention.

TABLE 1

| Output | Phase of path 1 (short path + long path) | Phase of path 2 (long path + short path) | Phase difference |
| --- | --- | --- | --- |
| Output | $(0 + 0 + \pi/2 + \Phi_A) +$ | $(\pi/2 + 0 + 0 + 0) +$ | $\Phi_A - \Phi_B$ |

TABLE 1-continued

| Output | Phase of path 1 (short path + long path) | Phase of path 2 (long path + short path) | Phase difference |
|---|---|---|---|
| 1 | $(0 + 0 + 0 + \pi/2)$ | $(\Phi_B + \pi/2 + 0 + 0)$ | |
| Output 2 | $(0 + 0 + \pi/2 + \Phi_A) +$ $(0 + 0 + 0 + 0)$ | $(\pi/2 + 0 + 0 + 0) +$ $(\Phi_B + \pi/2 + 0 + \pi/2)$ | $\Phi_A - \Phi_B - \pi$ |

Referring to Table 1, two outputs 671 and 672 of a receiving-end may have a phase difference of $\pi$, and the receiving-end may have various outputs based on an amount of phase modulation performed by the transmitting-end optical phase modulator 630 and the receiving-end optical phase modulator 650. When the transmitting-end optical phase modulator 630 and the receiving-end optical phase modulator 650 allow the same phase modulation, an output 1 671 may show a maximal single photon detection probability by constructive interference and an output 2 672 may show a minimal probability by destructive interference.

Figure 7:
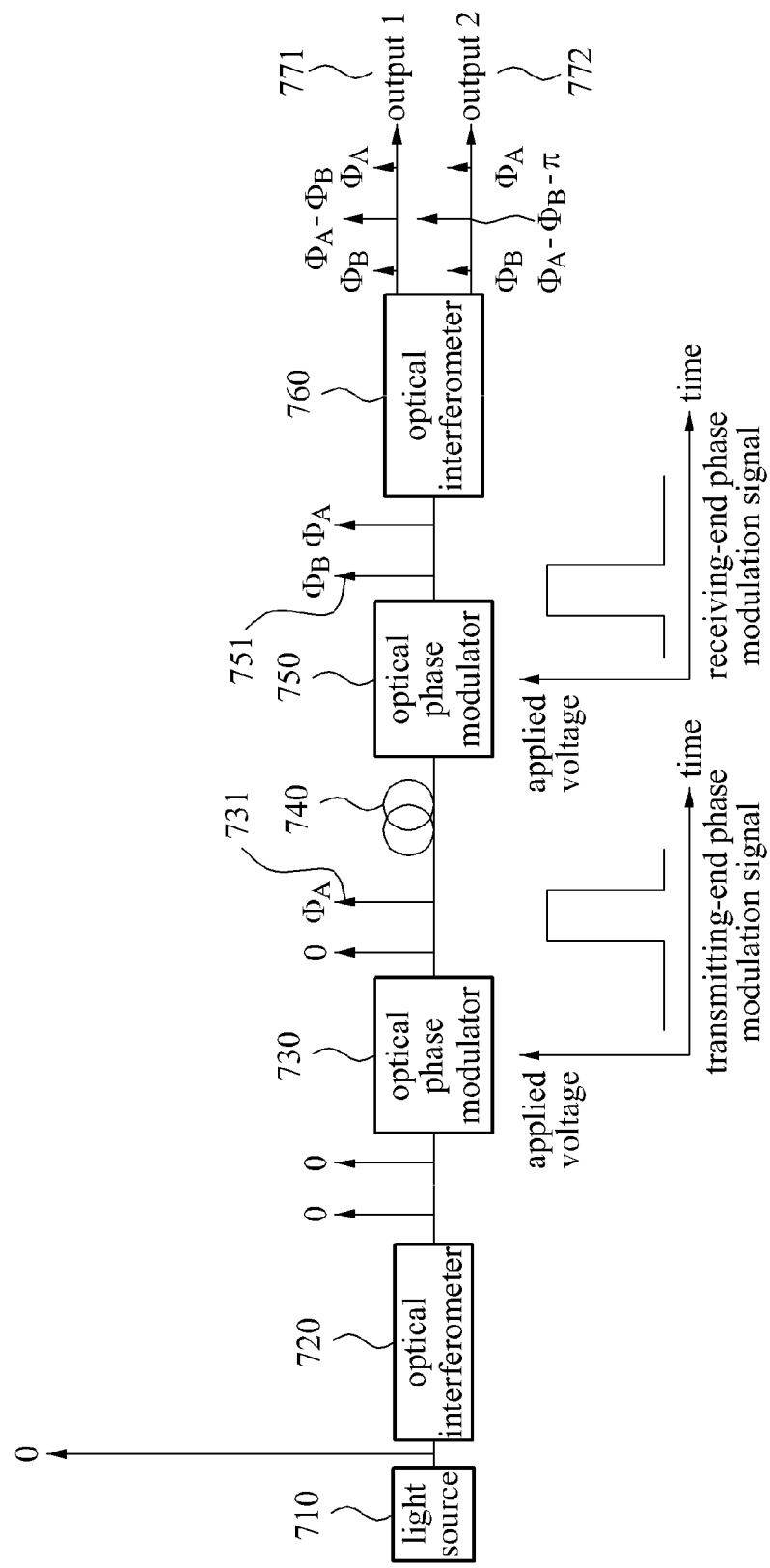
FIG. 7 is a diagram illustrating an example of a phase modulation method and apparatus according to an embodiment of the present invention.

FIG. 7 illustrates an example of a phase modulation method and apparatus according to an embodiment of the present.

Referring to FIG. 7, a height of a vertical arrow denotes a detection probability of a single photon. A number marked above the arrow denotes a relative phase of the single photon. A single photon may be outputted from a light source 710, may pass through an optical interferometer 720, and may be inputted to a transmitting-end optical phase modulator 730. The transmitting-end optical phase modulator 730 may modulate a phase of at least one of two single photons by $\Phi_A$ 731. After the two single photons pass through a channel 740, a receiving-end optical phase modulator 750 may modulate a phase of a single photon that is not phase-modulated by the transmitting-end optical phase modulator 730 by $\Phi_B$ 751. A modulation signal of which a time and a width are adjusted may be inputted to the optical phase modulators 730 and 750, to selectively modulate the two single photons. A graph of a modulation signal to be inputted to the transmitting-end optical phase modulator 730 and a graph of a modulation signal to be inputted to the receiving-end optical phase modulator 750 are illustrated respectively beneath relative locations 731 and 751 on a time axis where a phase of a corresponding single photon is to be modulated.

Although the present embodiment describes that the transmitting-end optical phase modulator 730 may modulate a phase of a preceding single photon by $\Phi_A$, the transmitting-end optical phase modulator 730 may modulate a phase of a following single photon. In this example, the receiving-end optical phase modulator 750 may modulate a phase of a single photon that is not phase-modulated by the transmitting optical phase modulator 730.

From an output 1 771 of an optical interferometer 760 of a receiver, two single photon detection distributions of two single photons that are unrelated to interference and are respectively phase-modulated by $\Phi_A$ and $\Phi_B$ may be outputted with a probability of $1/16$, and a single photon detection distribution of a single photon interfering based on a phase difference of $\Phi_A - \Phi_B$ may be outputted with a probability of $1/8$. A single photon distribution of a single photon interfering based on a phase difference of $\Phi_A - \Phi_B - \pi$ it may be outputted to a center of an output 2 772.

Table 2 illustrates an example of a phase modulation based quantum key distribution method. Table 2 organizes an amount of phase modulation allowed by an optical phase modulator of each of a transmitter and the receiver, after a quantum key distribution protocol being referred to as Bennett Brassard 84 (BB84) is applied.

TABLE 2

| Stage | Contents | value | | | | | | | |
|---|---|---|---|---|---|---|---|---|---|
| 1 | Transmitting-end bit info. | 0 | | 1 | | 0 | | 1 | |
| | Transmitting-end basis info. | 0 | 1 | 0 | 1 | 0 | 1 | 0 | 1 |
| 2 | Transmitting-end phase modulation ($\Phi_A$) | 0 | $\pi/2$ | $\pi$ | $3\pi/2$ | 0 | $\pi/2$ | $\pi$ | $3\pi/2$ |
| 3 | Receiving-end basis info. | | | 0 | | | | 1 | |
| 4 | Receiving-end phase modulation ($\Phi_B$) | | | 0 | | | | $\pi/2$ | |
| 5 | Output 1 interference light phase difference ($\Phi_A - \Phi_B$) | 0 | $\pi/2$ | $\pi$ | $3\pi/2$ | $-\pi/2$ | 0 | $\pi/2$ | $\pi$ |
| | Output 2 interference light phase difference ($\Phi_A - \Phi_B - \pi$) | $-\pi$ | $-\pi/2$ | 0 | $\pi/2$ | $-3\pi/2$ | $-\pi$ | $-\pi/2$ | 0 |
| 6 | Detection probability of detector 1 | Max | ? | Min | ? | ? | Max | ? | Min |
| | Detection probability of detector 2 | Min | ? | Max | ? | ? | Min | ? | Max |

Referring to FIG. 2, the transmitting-end optical phase modulator 230 may perform four levels of phase modulations by combining bit information corresponding to a quantum key and basis information enabling a secure communication. Each bit may have two orthogonal basis information. The basis information may be randomly generated. Therefore, a single photon having a phase value, such as 0, $\pi/2$, $\pi$, $3\pi/2$, and the like, may be generated. A receiving-end may randomly generate two orthogonal basis information and may apply the generated information without being combined with bit information. In this case, the receiving-end optical phase modulator 250 may phase-modulate the single photon by 0 or $\pi/2$, or may phase-modulate the single photon by $\pi$ or $3\pi/2$. Generally, for convenience of operation of the receiving-end optical phase modulator 250, the single photon may be modulated by 0 or $\pi/2$ to provide the orthogonal basis information.

In this case, an optical interference due to the phase modulation of Table 2 may be incurred. In Table 2, a question mark, namely, "?", denotes a case where a single photon is detected, by the single photon detector 270, with a probability that is different from a maximal probability and a minimal probability, since basis information randomly generated from a transmitting-end is different from the basis information randomly generated from the receiving-end. The result may be deleted because the result is regarded as invalid data during a basis information exchanging process of the quantum key distribution system and thus, the result may not have any value of regard in operation of an optical interferometer.

Figure 8:
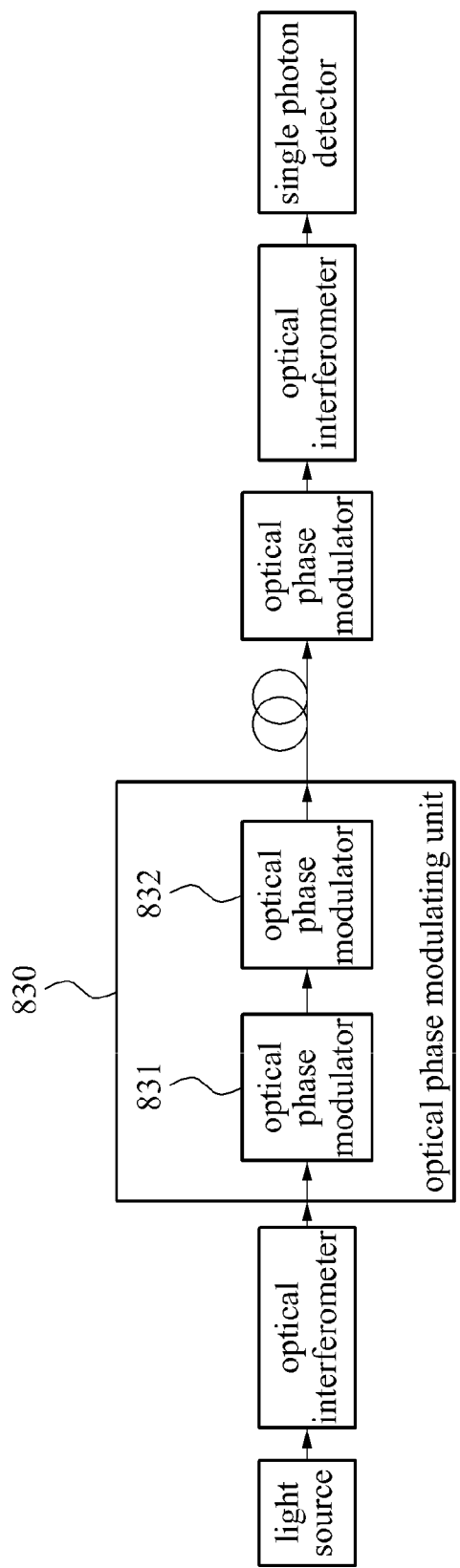
FIG. 8 is a diagram illustrating an example of constructing a transmitting-end optical phase modulating unit by successively arranging optical phase modulators.

FIG. 8 illustrates an example of constructing a transmitting-end optical phase modulating unit 830 by successively arranging optical phase modulators.

Referring to FIG. 8, a four-level phase modulation of a transmitting-end may be performed based on a scheme of successively using two optical phase modulators. Specifically, the optical phase modulators may be successively arranged so that one 831 of the two optical phase modulators modulates a phase of a single photon based on bit information and a remaining optical phase modulator 832 may modulate a phase of the single photon based on basis information. The optical phase modulator modulating the phase of the single photon corresponding to the bit information and the optical phase modulator modulating the phase of the single photon corresponding to the basis information may be arranged in a different sequence.

An output feature of an optical interferometer may be improved based on the optical phase modulating method according to an embodiment of the present invention. According to an embodiment of the present invention, an optical phase modulator is arranged outside an optical interferometer to easily configure the optical interferometer and thus, instability of the optical interferometer may be prevented. In addition, the optical phase modulator arranged outside the optical interferometer may stabilize the optical interferometer.

Figure 9:
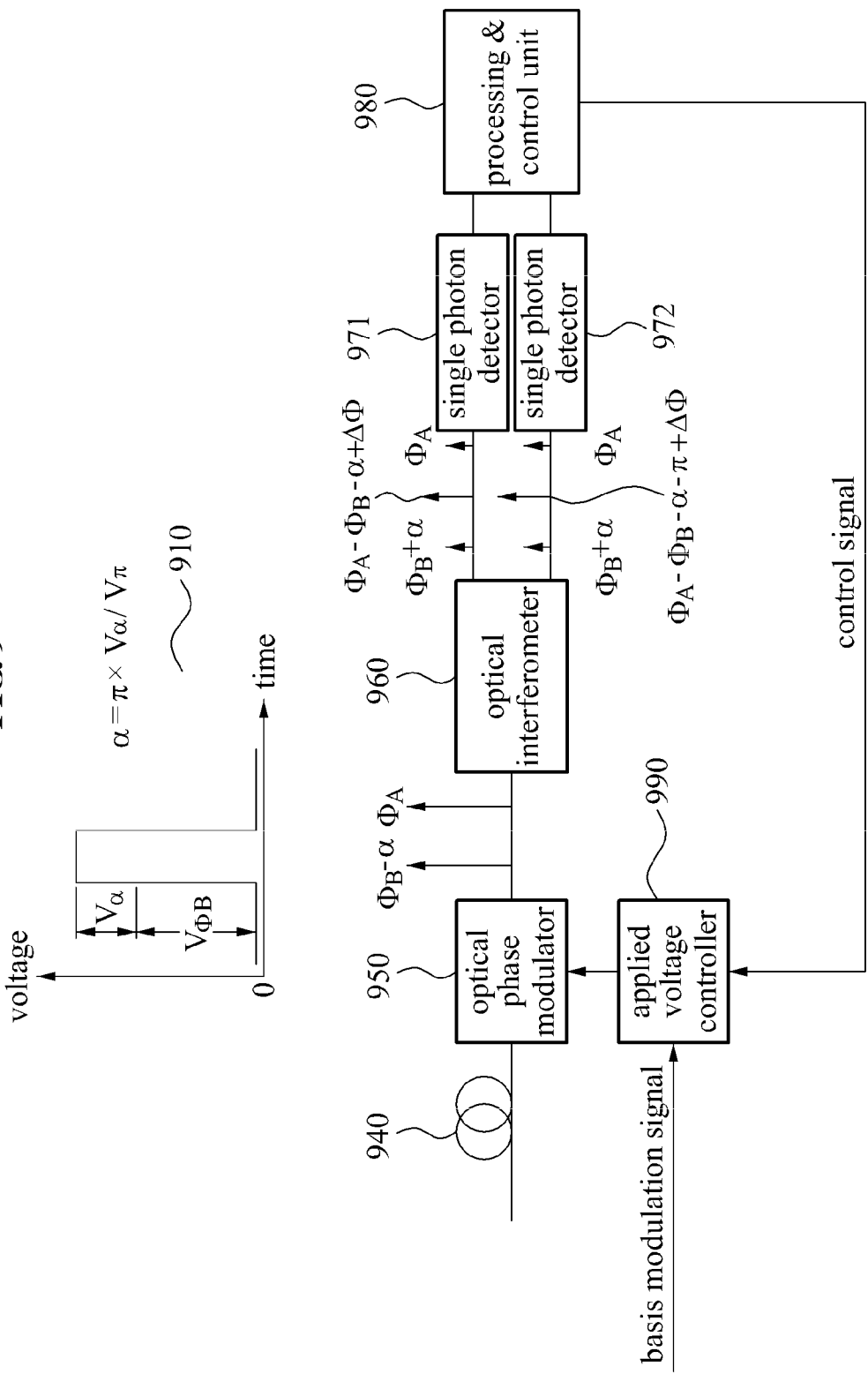
FIG. 9 is a diagram illustrating a system that stabilizes an optical interferometer by correcting a phase difference incurred in the optical interferometer according to an example embodiment of the present invention.

FIG. 9 illustrates a system that stabilizes an optical interferometer by correcting a phase difference incurred in the optical interferometer according to an example embodiment of the present invention.

Referring to FIG. 9, a path difference of an asymmetric optical interferometer of a transmitter and a path difference of an asymmetric optical interferometer of the receiver may be changed depending on an environment, such as different external temperatures, vibration, and the like. In this case, two outputs of an optical interferometer may indicate a value that may be different from a maximal detection probability and a minimal detection probability. According to an optical interferometer method, a processing and control unit 980 may continuously monitor a number of single photons detected by single photon detectors 971 and 972. An optical interferometer visibility (V) may be calculated based on the number of detected single photons as given in Equation 2.

$$V = \frac{C_{max} - C_{min}}{C_{max} + C_{min}}. \quad \text{[Equation 2]}$$

In Equation 2, $C_{max}$ may denote a number of photons detected with a maximal probability, and $C_{min}$ may denote a number of photons detected with a minimal probability. A change in V may be incurred due to a phase difference ($\Delta\Phi$) between an optical interferometer of a transmitting-end and an optical interferometer 960 of a receiving-end, and may satisfy Equation 3.

$$\frac{1-V}{2} = \sin^2\left(\frac{\Delta\Phi}{2}\right). \quad \text{[Equation 3]}$$

A change in the phase difference may be calculated based on a change in the number of detected single photons, using Equation 2 and Equation 3. An applied voltage may be adjusted by an applied voltage controller 990 based on the change in the phase difference when a receiving-end optical phase modulator 950 is operated. A voltage used by the receiving-end optical phase modulator to cause a change of a phase difference of $\pi$ may be $V\pi$. Therefore, when the receiving-end optical phase modulator operates, $V\alpha$ may be additionally provided to provide an additional change of $\alpha$ (=$\pi$/$V\pi \times V\alpha = \Delta\Phi$) for the phase. In this manner, a phase difference between the optical interferometer of a transmitter and the optical interferometer 960 of a receiver may be corrected using the optical phase modulator arranged outside the interferometer.

Referring to FIG. 9, a graph at the top of FIG. 9 may be an example of a phase modulation signal of the receiving-end optical modulator to which $V\alpha$ is additionally applied.

Figure 10:
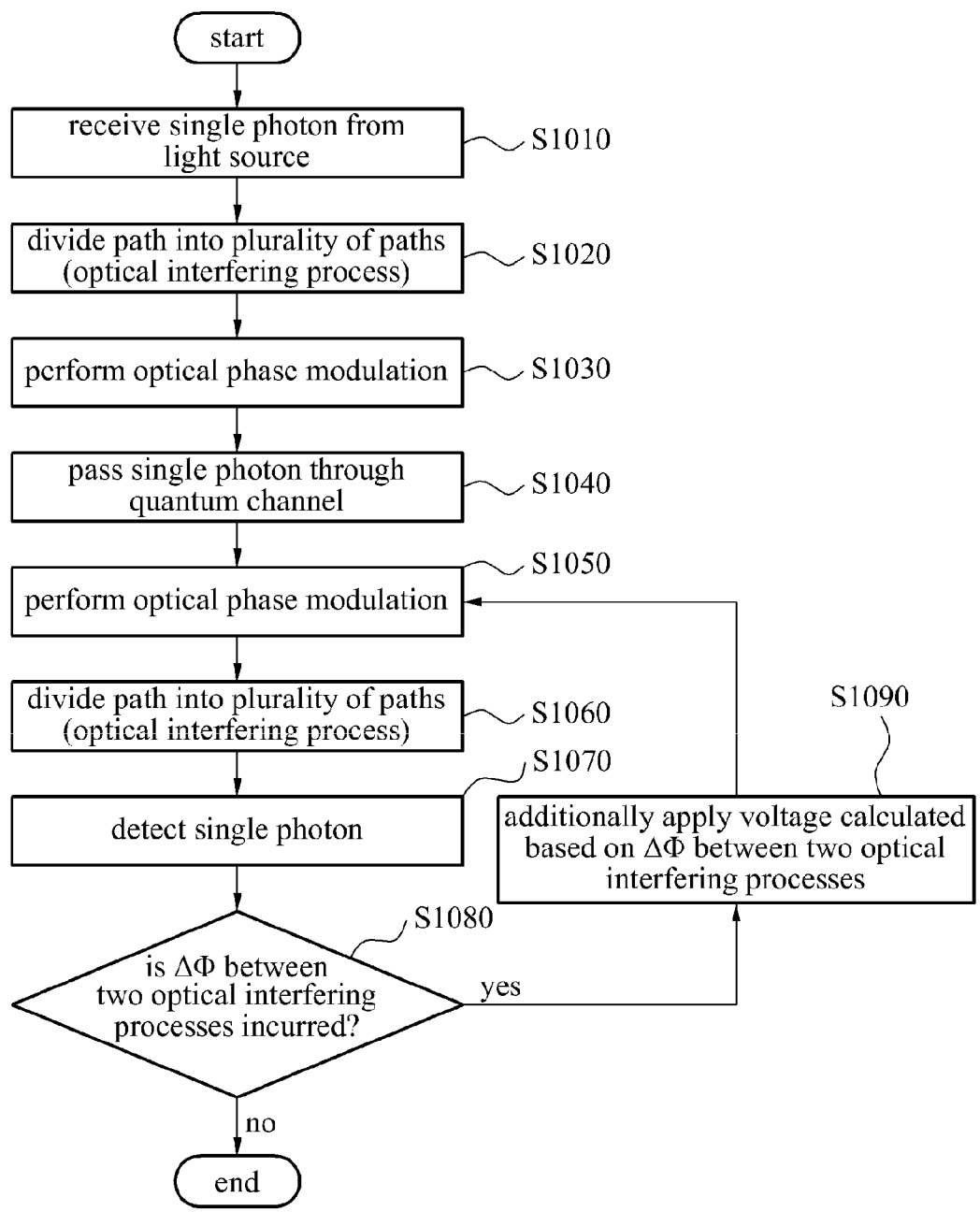
FIG. 10 is a flowchart illustrating a method of stabilizing an optical interferometer by correcting a phase difference incurred in the optical interferometer according to an embodiment of the present invention.

FIG. 10 illustrates a method of stabilizing an optical interferometer by correcting a phase difference incurred in the optical interferometer according to an embodiment of the present invention.

A single photon is received from a light source in operation S1010.

A path is divided into a plurality of paths to enable a probability of existence of the single photon to be distributed in a plurality of different coordinates in a time domain in operation S1020. In this case, an interfering method may be a Mach-Zehnder optical interfering method or a Michelson optical interfering method, and may be performed based on an optical fiber or an optical system. Also, a polarization maintaining fiber or a polarization controller may be used.

A modulation signal of which a time and a width are adjusted is inputted to selectively modulate a phase of a single photon corresponding to at least one of the plurality of paths in operation S1030. Therefore, the modulation signal of which the time and the width are adjusted may be inputted.

Optical phase modulations may be successively performed. In this case, one of the optical phase modulations may modulate a phase of a single photon based on bit information, and a remaining optical phase modulation may modulate a phase of the single photon based on basis information.

The single photon passes through a quantum channel in operation S1040. The quantum channel may be based on an optical fiber.

A phase of a single photon that is not modulated in operation S1030, from the single photon received via the quantum channel, may be selectively modulated in operation S1050. In this case, the modulation signal of which a time and a width are adjusted may be inputted.

Subsequently, a path of the single photon is divided into a plurality of paths to enable a probability of existence of the single photon to be distributed in a plurality of different coordinates in a time domain in operation S1060, which is an optical interfering process. In this case, the interfering method may be a Mach-Zehnder optical interfering method or a Michelson interfering method, and may be performed based on the optical-fiber or the optical system. Also, the polarization maintaining fiber or the polarization controller may be used.

A single photon detector detects an outputted single photon in operation S1070.

In this case, an optical interferometer visibility is calculated based on a number of detected single photons, and a phase difference (ΔΦ) between two optical interfering processes of operations S1020 and S1060 is calculated in operation S1080. Equation 2 and Equation 3 may be used for the calculation. $C_{max}$ may denote a number of single photons detected with a maximal probability and $C_{min}$ may denote a number of single photons detected with a minimal probability. When ΔΦ is not incurred, the detecting process may be terminated.

When ΔΦ is incurred, an applied voltage of an optical phase modulating process may be adjusted based on ΔΦ. During the optical phase modulating process, a voltage used to cause a phase change of π may be Vπ. Therefore, when an optical phase modulating process is performed in operation S1050, Vα may be additionally provided to provide an additional change of α ($=\pi/V\pi \times V\alpha = \Delta\Phi$) for the phase in operation S1090.

In this manner, the phase difference between the optical interference processes may be corrected by optical modulating processes of operations S1030 and S1050 that are separately operated from interfering processes of operations S1020 and S1060

The phase difference may be corrected without operations S1080 and S1090.

The optical phase modulation method has been described. Descriptions described with reference to FIGS. 2 through 9 may be applicable to the optical phase modulation method and thus, detailed descriptions thereof will be omitted.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A transmitting apparatus of a quantum key distribution system, the transmitting apparatus comprising:
    an optical interferometer to receive a single photon inputted from a light source, and to divide a path into a plurality of paths to enable a probability of existence of the inputted single photon to be distributed in a plurality of coordinates in a time domain; and
    an optical phase modulator being connected to an outside of the optical interferometer, and modulating a phase of a single photon corresponding to at least one path from among the plurality of paths,
    wherein the optical phase modulator includes successively connected at least two optical phase modulators wherein one of the at least two optical phase modulators modulates the phase of the single photon based on bit information and the other one of the at least two optical phase modulators modulates the phase of the single photon based on basis information.

2. The transmitting apparatus of claim 1, wherein the optical interferometer includes one of an optical fiber-based Mach-Zehnder interferometer and an optical fiber-based Michelson interferometer.

3. The transmitting apparatus of claim 2, wherein the optical interferometer is the optical fiber-based Mach-Zehnder interferometer, and further includes a polarization controller.

4. The transmitting apparatus of claim 2, wherein the optical interferometer is the optical fiber-based Mach-Zehnder interferometer, and is constituted of polarization maintaining fibers.

5. The transmitting apparatus of claim 1, wherein the optical interferometer includes one of an optical system-based Mach-Zehnder interferometer and an optical system-based Michelson interferometer.

6. A receiving apparatus of a quantum key distribution system, the receiving apparatus comprising:
    an optical phase modulator to receive a single photon from a transmitting apparatus of a quantum key distribution system, and to modulate a phase of a single photon that is not modulated from the received single photon; and
    an optical interferometer to divide a path of the single photon received from the optical phase modulator to enable a probability of existence of the single photon received from the optical phase modulator to be distributed in a plurality of coordinates in a time domain,
    wherein the optical phase modulator is connected to an outside of the optical interferometer,
    wherein the optical phase modulator includes successively connected at least two optical phase modulators wherein one of the at least two optical phase modulators modulates the phase of the single photon based on bit information and the other one of the at least two optical phase modulators modulates the phase of the single photon based on basis information.

7. The receiving apparatus of claim 6, wherein the optical interferometer includes one of an optical fiber-based Mach-Zehnder interferometer and an optical fiber-based Michelson interferometer.

8. The receiving apparatus of claim 7, wherein the optical interferometer is the optical fiber-based Mach-Zehnder interferometer, and further includes a polarization controller.

9. The receiving apparatus of claim 6, wherein the optical interferometer is the optical fiber-based Mach-Zehnder interferometer, and is constituted of polarization maintaining fibers.

10. The receiving apparatus of claim 6, wherein the optical interferometer includes one of an optical system-based Mach-Zehnder interferometer and an optical system-based Michelson interferometer.

11. A quantum key distribution system, the system comprising:
    a transmitting-end optical phase modulating unit including an optical phase modulator to input, with respect to a single photon, a modulation signal of which a time and a width is adjusted, a path of the single photon being divided into a plurality of paths to enable a probability of existence of the single photon to be distributed in a plurality of different coordinates, and to selectively modulate a phase of a single photon corresponding to at least one path from among the plurality of paths; and
    a receiving-end optical phase modulating unit to selectively modulate a phase of a single photon that is not modulated by the transmitting-end optical phase modulating unit from the single photon received via the transmitting-end optical phase modulating unit,
    wherein the optical phase modulator includes successively connected at least two optical phase modulators wherein one of the at least two optical phase modulators modulates the phase of the single photon based on bit information and the other one of the at least two optical phase modulators modulates the phase of the single photon based on basis information.

12. The system of claim 11, wherein the transmitting-end optical phase modulating unit comprises a plurality of optical modulators that are successively connected.

13. The system of claim 12, wherein one of the plurality of optical phase modulators of the transmitting-end optical phase modulating unit modulates a phase of a single photon based on bit information, and another one of the plurality of optical phase modulators of the transmitting-end optical phase modulating unit modulates the phase of the single photon based on basis information.

14. The system of claim 11, wherein an applied voltage of the receiving-end optical phase modulating unit is determined based on a phase difference between two optical interferometers respectively established in a transmitting-end and a receiving-end.

15. The system of claim 14, wherein the phase difference is calculated based on a number of single photons detected with a maximal probability and a number of single photons detected with a minimal probability.

16. A transmitting method of a quantum key distribution system, the method comprising:
    receiving a single photon inputted from a light source;
    performing an optical interfering process that divides a path of the single photon into a plurality of paths to enable a probability of an existence of the single photon to be distributed in a plurality of coordinates in a time domain; and
    performing an optical modulating process that modulates a phase of a single photon corresponding to at least one path from among the plurality of paths, outside an apparatus where the optical interfering process is performed,
    wherein the optical modulating process is performed by successively connected at least two optical phase modulators wherein one of the at least two optical phase modulators modulates the phase of the single photon based on bit information and the other one of the at least two optical phase modulators modulates the phase of the single photon based on basis information.

17. A receiving method of a quantum key distribution system, the receiving method comprising:
    performing an optical phase modulating process that receives a single photon transmitted via a transmitting-end, and modulates a phase of a single photon that is not modulated from the received single photon; and
    performing an optical interfering process that divides a probability of existence of the optical phase modulated-single photon to be distributed, with a plurality of different probabilities, in a time domain,
    wherein optical modulating process is performed separately from the optical interfering process,
    wherein the optical modulating process is performed by successively connected at least two optical phase modulators wherein one of the at least two optical phase modulators modulates the phase of the single photon based on bit information and the other one of the at least two optical phase modulators modulates the phase of the single photon based on basis information.

18. An optical phase modulating method of a quantum key distribution system, the method comprising:
    a transmitting-end optical phase modulating process of inputting, with respect to a single photon, a modulation signal of which a time and a width is adjusted, a path of the single photon being divided into a plurality of paths to enable a probability of existence of the single photon to be distributed in a plurality of different coordinates, and of selectively modulating a phase of a single photon corresponding to at least one path from among the plurality of paths; and
    a receiving-end optical phase modulating process of selectively modulating a phase of a single photon that is not modulated by the transmitting-end optical phase modulating process from the single photon received via the transmitting-end optical phase modulating process,
    wherein the transmitting-end optical phase modulating process is performed by successively connected at least two optical phase modulators wherein one of the at least two optical phase modulators modulates the phase of the single photon based on bit information and the other one of the at least two optical phase modulators modulates the phase of the single photon based on basis information.

* * * * *